Jan. 18, 1955 D. A. CRAIG 2,699,625
FISHHOOK EXTRACTOR
Filed May 18, 1951
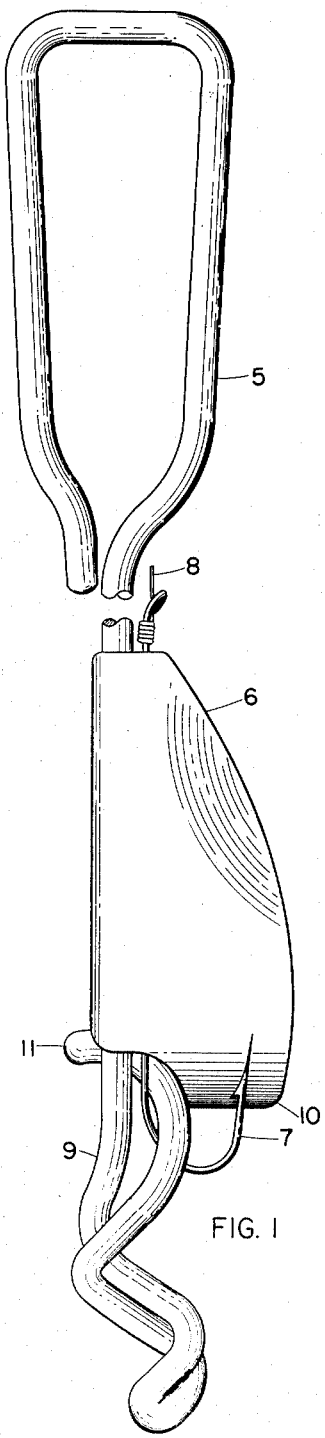
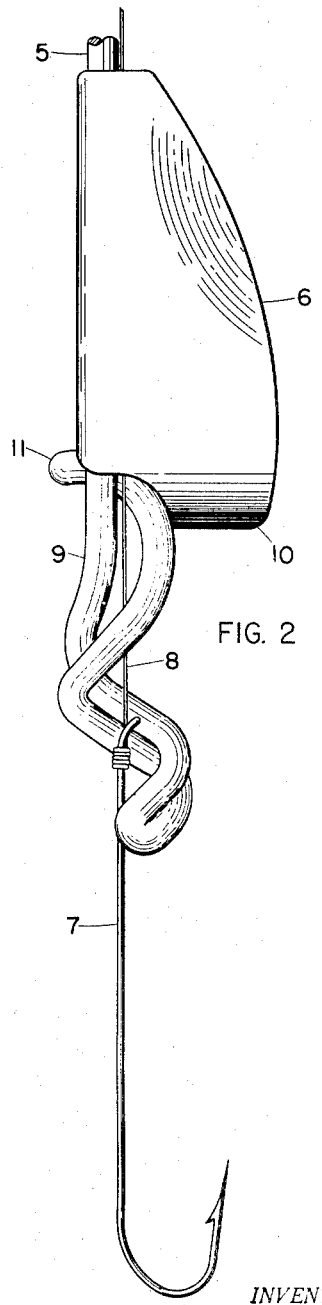
INVENTOR.
DAVID A. CRAIG
BY
*Samuel H. Davis*
ATTORNEY United States Patent Office 2,699,625
Patented Jan. 18, 1955

2,699,625

FISHHOOK EXTRACTOR

David A. Craig, Lansing, Mich.

Application May 18, 1951, Serial No. 227,075

1 Claim. (Cl. 43—53.5)

This invention relates to hooks, is particularly concerned with fish hooks, is more particularly concerned with fish hook devices, and is most particularly concerned with a device for extracting a fish hook from the flesh of the oral cavity of a fish.

In the prior art there is no satisfactory means for the extraction of a fish hook from the oral cavity of a fish as the imbedding of the said hook occurs in the normal procedure of fishing. Very frequently the hook is imbedded so deeply in the oral cavity of the fish that to remove the same without damage to the fishing tackle resort is had to mutilating a portion of the body of the fish. Such a procedure is not only wasteful of the fish as a food commodity but it is disliked by the fisherman because a mutilated fish diminishes the value of the catch. Frequently in an attempt to remove a hook which has been deeply imbedded in the flesh of the oral cavity of the fish, the fisherman will insert his fingers therein and may cause serious injury to the same.

It is therefore an object of this invention to provide a device for the extraction of a fish hook which has been imbedded in the flesh of the oral cavity of a fish. It is a further object to provide such a device whereby the fish hook can be removed with relative ease by the fisherman. It is still a further object to provide a device for the removal of a fish hook from the oral cavity of a fish without causing injury to the fisherman and without the necessity of mutilating any portion of the body of the fish.

I have now found that I am able to avoid the disadvantages encountered in the prior art and am able to accomplish the objects set forth and have accordingly discovered and invented a simple but novel device whereby I am able readily to extract a fish hook from the oral cavity of a fish no matter how deeply the said hook has been imbedded in the flesh of the said oral cavity.

In the accompanying drawing I have illustrated my invention which together with the following description discloses fully and clearly the full nature and novelty of the same.

Referring now to the drawing:

Fig. 1 is a view showing the device of my invention with the extractor pushed downwardly toward the hook and showing the point of the hook resting against the shield of the extractor.

Fig. 2 is a view of the extractor of my invention with the parts in position prior to the extractor being moved downwardly on the line to extract the hook from the mouth of the fish.

The fish hook extractor of my invention is structurally composed of the handle 5, the body of the extractor 9, both of which members are integral, and the shield 6. The shield 6 is made of sheet metal and is secured to the straight portion of the body 9 by soldering. It will be noted from the drawing that the end portion of the body 9 is substantially spiral. It will be further noted that the shield 6 has a curved portion and this is designated by the numeral 10. The curved end 11 of the member 9 extends slightly away from the adjacent part of such member to facilitate the passing of a fish line into the inside of the spiral.

The handle and the body portion of the extractor are made of substantially rigid metal wire, and to prevent corrosion should preferably be of stainless steel or other non-corrosive metal. The shield may be soldered to the body 9 of the extractor or may be welded thereto.

In the operation of the fish hook extractor, the line holding the hook which is imbedded in the flesh of the mouth of the fish is inserted into the spiral portion of the extractor by way of the passage between the end 11 and the adjoining portion of the member 9 into the position shown in Fig. 2. The extractor is now moved downwardly on the line toward the mouth of the fish with the spiral end leading. The handle of the extractor is held with the fingers of one hand and the portion of the line near the handle is held taut and contiguous to such handle with the other hand. The continued downward movement of the extractor causes the shank of the hook to enter the spiral portion of the extractor and to be rotated thereby until the point of the hook comes into contact with the shield in the position shown in Fig. 1. This partially rotates the hook out of the flesh of the fish and the hook and the extractor may then be removed from the mouth of the fish.

Having clearly set forth the construction, utility and advantages of my invention I wish particularly to state that it will be apparent that changes in the details of the construction and arrangement of the various members of the invention may be resorted to without departing from the spirit and scope of the invention as hereinafter claimed.

I claim:

A fish hook extractor comprising an elongated wire body having a handle portion at one end thereof, a substantially spiral portion at the opposite end of said body from the handle portion, said spiral portion of the body having a reverse fold with the portions of the fold having a spiral bend, and a shield mounted on said body adjacent one end of said spiral portion thereof, said shield having a curved end portion, the extractor being adapted to be placed on a fish line having a hook at one end thereof with the line extending through turns of the spiral portion and the extractor being adapted to be moved downwardly on said line until the point of the hook rests against the curved portion of said shield, the spiral portion of the extractor acting to rotate the hook during the said downward movement.

References Cited in the file of this patent

UNITED STATES PATENTS

| Number | Name | Date |
|---|---|---|
| 498,094 | Verharen | May 23, 1893 |
| 2,155,898 | Harkins | Apr. 25, 1939 |
| 2,316,500 | Bray | Apr. 13, 1943 |
| 2,441,458 | Underwood | May 11, 1948 |